E. I. KIMMEY.
RESILIENT WHEEL.
APPLICATION FILED SEPT. 20, 1917.

1,314,337. Patented Aug. 26, 1919.

INVENTOR
Eugene I. Kimmey

BY
Parsons Pordell
ATTORNEYS

UNITED STATES PATENT OFFICE.

EUGENE I. KIMMEY, OF SYRACUSE, NEW YORK.

RESILIENT WHEEL.

1,314,337.                     Specification of Letters Patent.       Patented Aug. 26, 1919.

Application filed September 20, 1917. Serial No. 192,339.

*To all whom it may concern:*

Be it known that I, EUGENE I. KIMMEY, a citizen of the United States, and a resident of Syracuse, in the county of Onondaga and State of New York, have invented a certain new and useful Resilient Wheel, of which the following is a specification.

This invention relates to resilient wheels, and has for its object a wheel which is particularly simple in construction, and highly efficient and durable in use, and it consists in the combinations and constructions hereinafter set forth and claimed.

In describing this invention, reference is had to the accompanying drawings in which like characters designate corresponding parts in all the views.

Figure 1:
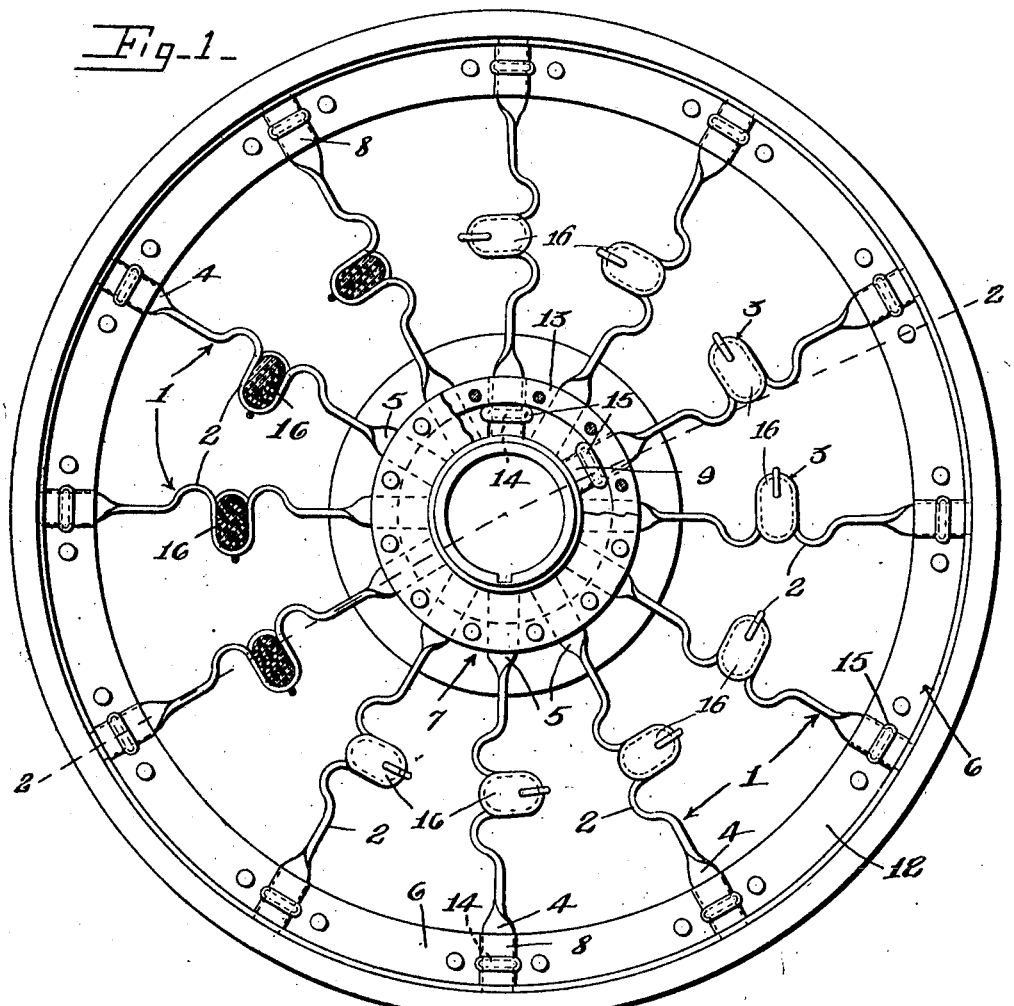
Figure 1 is an elevation of a wheel embodying my invention, the tire being removed.
Figure 2:
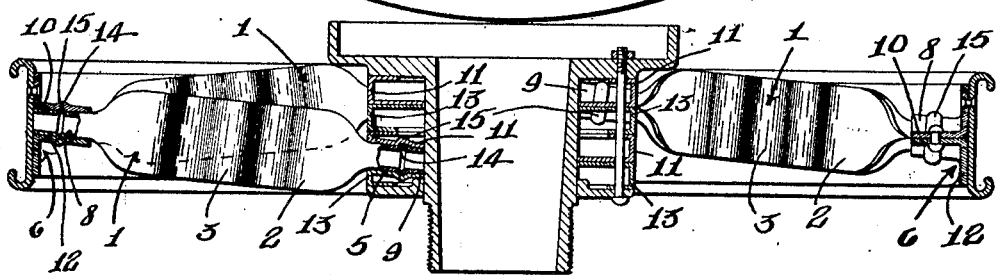
Fig. 2 is a sectional view on line 2—2, Fig. 1.

This wheel comprises spokes having resilient blade-like intermediate portions between the hub and felly of the wheel, said portions being formed with loops or corrugations.

The intermediate blade-like portion of the spoke is arranged with its widthwise dimension extending crosswise of the plane of the wheel in order that the loops therein may act to more readily relieve the wheel, tire and the vehicle from sudden starting strain or torque from the axle.

1 designates the spokes of the wheel, each spoke having an intermediate blade-like portion 2 formed with corrugations or loops 3 therein which increase the resiliency of the spoke. The spokes are also formed with shanks 4, 5 at their ends for connection to the felly 6 and hub 7 of the wheel. The spokes are preferably formed up out of flat sheet metal strips having their end portions rolled to form the shanks 4, 5.

Usually there are three loops in each spoke, the middle loop being of twice the size as the other loops.

As here shown, the shanks 4, 5 are fitted respectively into sockets 8, 9 on the felly 6 and hub 7 and are secured therein in any suitable manner.

The sockets may be formed in opposing sections, carried by rings 10 and 11 fixed to the felly and the hub respectively and rings 12 and 13 coacting with the former rings and detachably secured to the felly or hub in any suitable manner as by bolts. The ring 12 near the felly may be part of a demountable rim. The shanks of the spokes are provided with raised peripheral beads 14 which engage complemental grooves 15 in the sockets. The spokes may however, be secured to the felly and hub in any suitable manner.

Preferably, the inner ends of the spokes are arranged staggered while the outer ends are arranged in alinement.

If desired buffers 16 may be arranged in the middle loops 3 as shown in some of the spokes, Fig. 1 to prevent collapse and breaking of the main loop, these buffers being secured in position in any suitable manner. In Fig. 1 but part of the spokes are shown as provided with these buffers, but in practice all or none will have buffers. Also in Fig. 1 some of the buffers are shown in section.

In use, the corrugations 3 of the intermediate parts 2 of the spokes make the spokes resilient to tension and compression, and hence relieve the tire, the hub, and the vehicle of many road shocks, and the blade-like portion 2 arranged with its widthwise dimension transversely of the wheel relieves the tire and vehicle from the sudden shock of starting, as the looped blade-like portion of the spokes permit the hub to turn slightly relatively to the felly.

What I claim is:

1. A resilient wheel comprising a felly, a hub, spaced radially arranged staggered spokes, laterally separable clamping means for securing the outer ends of the spokes in alinement to the felly, and additional laterally separable clamping means for securing the inner ends of the spokes in staggered relation, said additional means consisting of separate sets of coacting rings arranged in a transverse series on the hub and having opposing sockets, the walls of the sockets and the spokes having interlocking complementary grooves and ribs.

2. A resilient wheel comprising a felly, a hub, resilient spokes formed at their ends with shanks, laterally separable clamping means common to the spokes for clamping their ends to the felly and the hub, said clamping means consisting of annular rings having opposing sockets, the walls of the sockets and the shanks being provided with complementary interlocking grooves and ribs.

3. A resilient wheel comprising spokes, each having shanks at its ends for connection to the felly and the hub of the wheel and having an intermediate blade-like portion consisting of a relatively large central loop and small reversely arranged inner and outer loops, the central loop having spaced sides and a substantially semicircular connecting bend at one end of the central loop, the other end of the central loop being open and the inner and outer loops being of relatively less extent than the central loop and approximately semi-circular and connected with the sides of the central loop at the open end thereof, said loops being compressible radially of the wheel and flexible circumferentially of the same and rigid against lateral bending.

In testimony whereof, I have hereunto signed my name, at Syracuse, in the county of Onondaga, and State of New York, this 29th day of August, 1917.

EUGENE I. KIMMEY.